Patented Oct. 30, 1928.

1,689,366

UNITED STATES PATENT OFFICE.

WALTER SCHOELLER, OF BERLIN-WESTEND, AND HANS GEORG ALLARDT, OF BERLIN-REINICKENDORF-WEST, GERMANY, ASSIGNORS TO THE FIRM SCHERING-KAHLBAUM A. G., OF BERLIN, GERMANY.

METAL MERCAPTO ACID ESTERS AND PROCESS OF MAKING SAME.

No Drawing. Application filed December 16, 1927, Serial No. 240,629, and in Germany December 16, 1926.

Our invention refers to new products being esters of a metal mercapto acid and to the process of making same.

As is well known to those skilled in the art, the therapeutical effect of certain metals and metalloids, such as for instance gold, silver, arsenic, antimony and bismuth, is enhanced, if these elements are introduced into the body of the patient in the form of a deposit, from which the metal or metalloid is brought to action only gradually.

We have now found that particularly useful deposits of this kind can be made with the aid of metal or metalloid mercapto acid esters which are soluble in olive oil, sesame oil, ethylene or some other organic solvent adapted for use in injections.

These esters are obtained by causing oxides or salts of the metals and metalloids to react with esters of mercapto acid.

The new products thus obtained have the formula

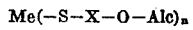

wherein Me is a metal or metalloid, preferably a heavy metal, X an organic acid radical and Alc an alcohol radical, $n$ indicating the valence of the metal or metalloid.

Example 1.

70 grams thiosalicylic acid-n-butyl ester boiling under 20 mms. mercury pressure at 163° C. are heated under stirring in a current of hydrogen or carbon dioxide during one hour with 25.7 grams of bismuth oxide to 170° C. in the oil bath. The bismuth oxide gradually dissolves almost completely, the water of reaction being allowed to distill off. After cooling the whole mass solidifies to form a greenish-yellow cake. By a single re-crystallization from alcohol the pure compound

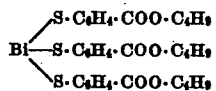

is obtained which forms needles melting at 72° C. and having a golden-yellow color. The compound readily dissolves in ether, chloroform, acetic ester, olive oil and sesame oil, only with difficulty in cold alcohol and is insoluble in water. Its content of bismuth was found to be 25.2 per cent (calculated 24.9 per cent).

Example 2.

33.5 grams thiosalicylic acid methyl ester boiling at 130° C. under 20 mms. mercury pressure are treated with 9.4 grams antimony trioxide, as described with reference to Example 1. The compound formed, on being re-crystallized from alcohol, forms white needles melting at 88° C., and dissolving readily in ether and acetic ester, while being insoluble in water and cold alcohol. Its content of antimony was found to be 19.5 per cent (calculated 19.3 per cent).

The same compounds can also be obtained by causing etheric solutions of bismuth bromide or iodide or other bismuth or antimony compounds soluble in organic solvents to act in absolute etheric solution on the mercapto acid esters, the reaction mixture being neutralized and the solvent removed by evaporation.

The silver and gold mercapto acid esters are obtained in a similar manner by acting for instance with the calculated quantities of alcoholic nitrate of silver or a solution of potassium auribromide in acetic ester on a solution of a mercapto acid ester in an organic solvent.

Similarly as the esters of thiosalicylic acid also aliphatic and heterocyclic mercapto acid esters can be made to react with the acids or salts of the metals or metalloids.

Example 3.

24.4 parts thiosalicylic acid-iso-amyl ester boiling at 172° C. under 20 mms. mercury pressure are treated with 7.7 parts bismuth oxide as described with reference to Example 1. Upon being re-crystallized from alcohol the compound is found to form yellow-green needles melting at 83° C.

It is readily soluble in ether, acetic ester, benzoic acid, cyclohexyl ester and other esters and olive oil, insoluble in water and dissolves only with difficulty in cold alcohol. Its content of bismuth is 23.7 per cent (calculated 23.7 per cent).

Example 4.

29 parts thiosalicylic acid bornyl ester boiling under a mercury pressure of 15 mms. at 221° C. and melting at 48° C. are dissolved in 50 parts absolute alcohol. To this solution are added 23 parts aurochloride and the solution is then heated to boiling. After cooling down the aurothiosalicylic acid bornyl ester crystallizes out and is recrystallized from absolute alcohol. The compound is almost colorless and readily dissolves in ether, chloroform, benzene, acetic ester and other esters as well as in olive oil. Its content of gold was found to be 40.3 per cent (calculated 40.2 per cent).

*Example 5.*

16.2 parts thioacetic acid-iso-amyl ester boiling under 15 mms. mercury pressure at 96° C. are heated for dissolution with 7.7 parts bismuth oxide as described with reference to Example 1. The resulting bismuth thioacetic acid-iso-amyl ester is liquid at ordinary temperature and solidifies in a bath of ether and carbonic acid. It can be purified by dissolving it in alcohol, quickly sucking off the solvent, when the compound has solidified in the cold bath mentioned above, the last traces of alcohol being removed in vacuo. The purified bismuth thioacetic acid-iso-amyl ester

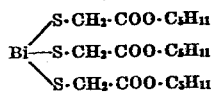

is a light-yellow oil which readily dissolves in organic solvents but is insoluble in water. Its content of bismuth was found to be 30.9 per cent (calculated 31.4 per cent).

*Example 6.*

10 parts thioacetic acid bornyl ester, boiling under 12 mms. mercury pressure at 175° C. are boiled a short time in some absolute alcohol with 10 parts aurochloride. On cooling the aurothioacetic acid bornyl ester crystallizes out. It is readily soluble in acetic ester, chloroform and olive oil and can be recrystallized from great quantities of alcohol. The pure gold compound

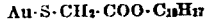

is altogether colorless and its gold content was found to be 47 per cent (calculated 46.5 per cent).

Various changes may be made in the details disclosed in the foregoing specification without departing from the invention or sacrificing the advantages thereof.

In the claims appended to this specification the term "metal" is meant to designate heavy metals and such metalloids (for instance arsenic) which are precipitated by hydrogen sulfide from solutions of their salts and allow the formation of mercapto compounds.

We claim:—

1. As new products, metal mercapto acid esters having the formula

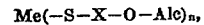

wherein Me is a metal, X an organic acid radical and Alc an alcohol radical, while $n$ indicates the valence of the metal.

2. As new products, the metal mercapto carboxylic acid esters having the formula

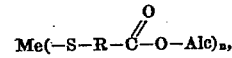

wherein Me is a metal, R a bivalent organic radical and Alc an alcohol radical, while $n$ indicates the valence of the metal.

3. As new products, the metal thiosalicylic acid esters having the formula

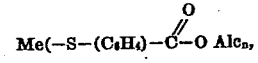

wherein Me is a metal and Alc an alcohol radical, while $n$ indicates the valence of the metal.

4. As new products, the metal thiosalicylic acid amyl esters having the formula

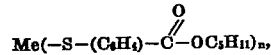

wherein Me is a metal, while $n$ indicates the valence of the metal.

5. As a new product, the bismuth thiosalicylic acid-iso-amyl ester having the formula

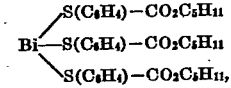

the compound forming yellow-green needles melting at 83° C. and being readily soluble in ether, acetic ester, benzoic acid, cyclohexyl ester and other esters and in olive oil, insoluble in water and dissolving only with difficulty in cold alcohol.

6. The process of producing metal mercapto acid esters comprising causing a metal compound to react with a mercapto acid ester.

In testimony whereof we affix our signatures.

WALTER SCHOELLER.
HANS GEORG ALLARDT.